April 10, 1962  R. A. ANDERSON  3,028,800
AUTOMATIC AIRFLOW CONTROL
Filed July 17, 1959  3 Sheets-Sheet 1

Richard A. Anderson
INVENTOR.

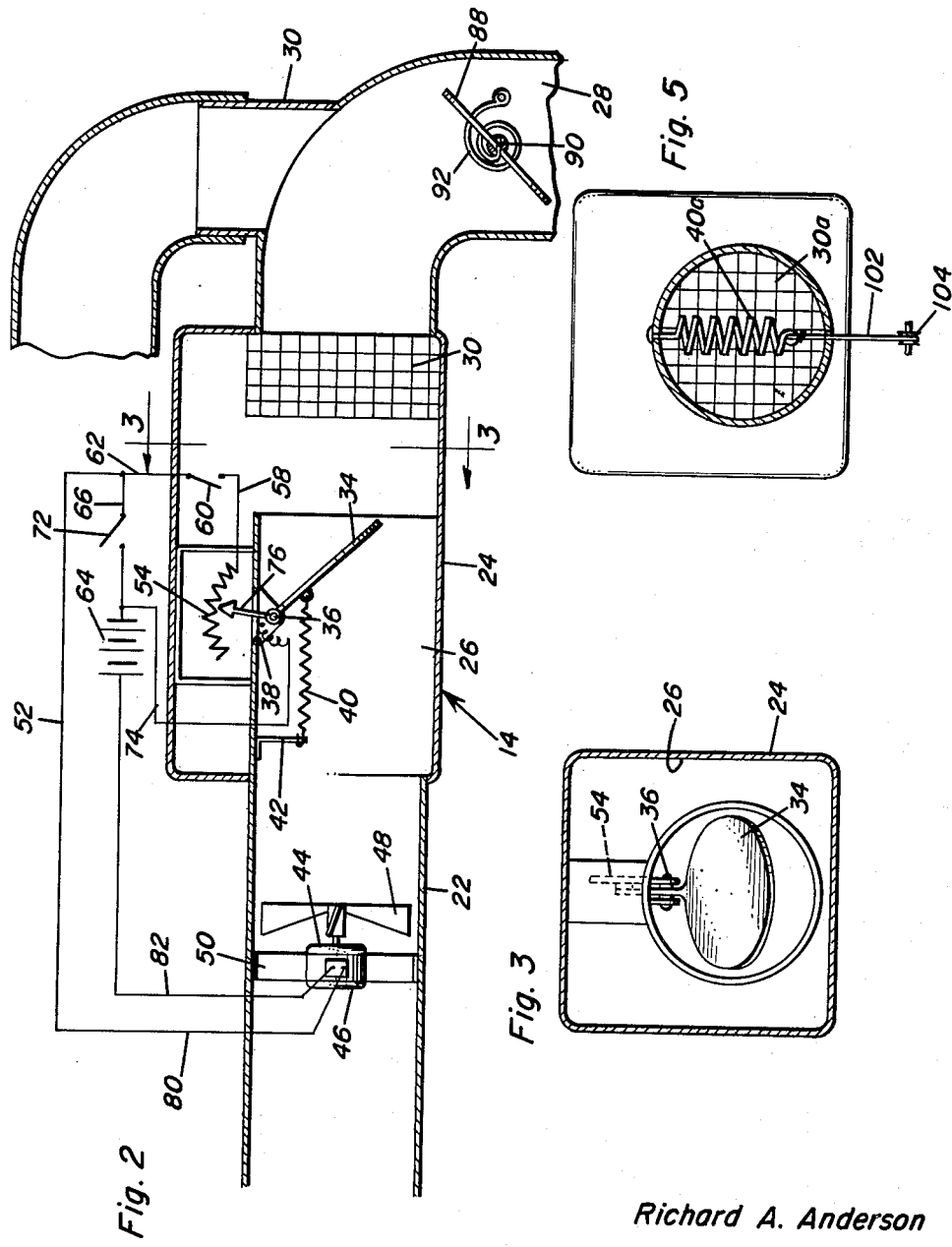

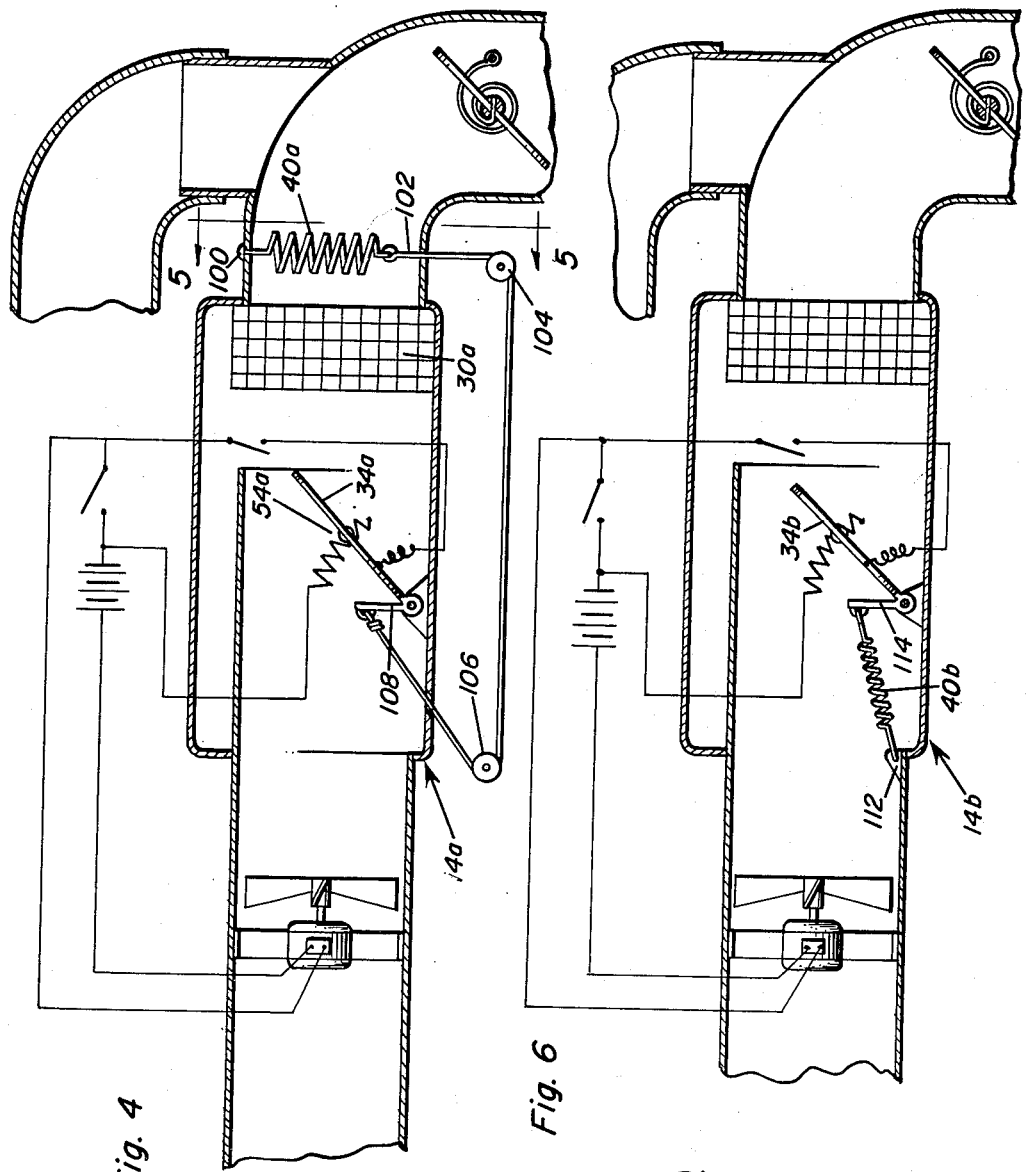

United States Patent Office 3,028,800
Patented Apr. 10, 1962

3,028,800
AUTOMATIC AIRFLOW CONTROL
Richard A. Anderson, Bethel, Minn.
Filed July 17, 1959, Ser. No. 827,842
1 Claim. (Cl. 98—2)

This invention relates to air controllers and more particularly to an automatic airflow controller for a motor vehicle.

An object of the invention is to provide an automatic controller for a motor vehicle which maintains incoming air for the motor vehicle at a uniform flow rate during all motor vehicle speeds. The invention may be applied in motor vehicles to make corrections in flow conditions with reference to heating or cooling, the latter including refrigeration cooling, i.e., vehicle air conditioners. However, to illustrate the principles of the invention, only the heater phase is discussed in detail.

Briefly, the above object and others are achieved by having an electrically operative blower with a speed control circuit sensitive to airflow conditions coordinated with forward movement of the motor vehicle and also with the temperature of the air as it passes through the duct and prior to entry into the cabin of the motor vehicle.

The blower is preferably located at the mouth or at some intermediate part of the air inlet duct, and the speed of the motor is regulated as a function of the position of a vane extending across or partially across the duct on the downstream side of the blower. A thermally responsive element is mounted in the duct or at least, in the airstream on the downstream side of the vane and also on the downstream side of a heat exchanger of conventional design. The heat exchanger is connected in the water cooling system of the internal combustion engine of the motor vehicle and is used for supplying the heat which warms the air handled by the controller inasmuch as hot water heat exchangers have been found to be most practical for motor vehicle use.

In very cold weather and during engine warming periods and in some types of heater installations, less air is required. Consequently, it is preferred that the vane be opposed in its movement by means of a spring which may be either of the thermally responding type or of some other type depending on whether thermal control is desired or whether a pure mechanical control is deemed adequate. Such a thermal element is omitted for air conditioning unit arrangements.

The ultimate object of the invention is to obtain uniform heating or cooling within the cabin of the motor vehicle, and this is achieved by obtaining an essentially uniform airflow through the heater to the passenger compartment as the motor vehicle changes speeds. The dynamic pressure on a face of the vane is a function of ram pressure as the motor vehicle moves and therefore the electric motor can be made to increase or decrease the cubic feet of air per minute displaced by the blower to augment the air inducted during normal forward movement of the motor vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged sectional view taken approximately on the line 2—2 of FIGURE 1;

FIGURE 3 is a transverse sectional view taken on the line 3—3 of FIGURE 1, portions of the electrical circuit which are diagrammatically shown in FIGURE 2 being omitted;

FIGURE 4 is a sectional view similar to FIGURE 2 but showing a modification of the invention;

FIGURE 5 is a sectional view taken approximately on the line 5—5 of FIGURE 4 and here again, the electrical circuit which is diagrammatically shown in FIGURE 4 is omitted in FIGURE 5; and FIGURE 6 is a longitudinal sectional view of a further modification of the invention.

Figure 1:
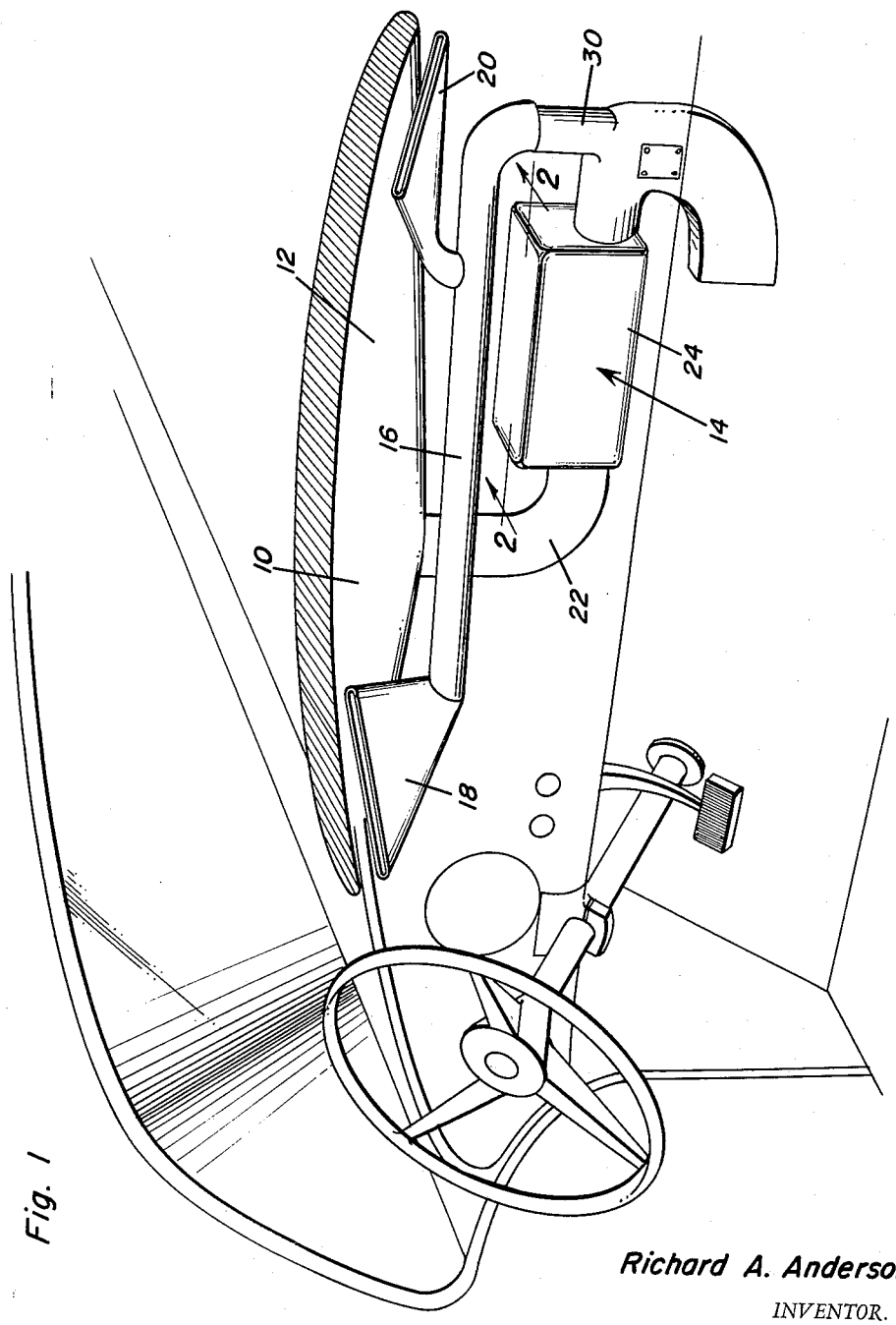
FIGURE 1 is a fragmentary perspective view of the interior of a motor vehicle showing one typical installation of an embodiment of the invention.

In the accompanying drawings the interior 10 of a motor vehicle 12 is shown in FIGURE 1. Only one manufacturer's make of motor vehicle has been selected to illustrate the principles of the invention, although it is to be clearly understood that various manufacturers' makes of motor vehicles may profit by the heat controller 12 in accordance with the invention.

Heat controller 14 replaces a section of the conventional automotive vehicle (automobile, truck, bus, etc.) heater system or may be a conversion for the heater system. The typical heater system in FIGURE 1 includes defroster ducts 16 with defroster nozzles 18 and 20 together with an air inlet duct 22 operatively connected with casing 24 which forms an air chamber 26 and which has a heated air outlet duct 28 connected therewith. The heated air outlet duct 30 is also connected therewith, and this feeds the defroster duct 16 as shown in FIGURES 1 and 2.

Casing 24 has a heat exchanger 30 mounted therein, and this heat exchanger is a conventional heat exchanger or substitute therefor as found in heater systems for automotive vehicles. Consequently, it has water inlets and outlets (not shown) integrated with the cooling system of the motor vehicle internal combustion engine. This is a portion of the heater system which may be retained in a conversion assembly or which may be supplied as a part of the original equipment if controller 14 is to be considered original equipment. Whether the controller 14 is original equipment or a conversion job is merely a matter of installation.

Reference is now made principally to FIGURE 2. A vane 34 is shown mounted on a hinge pin 36 that is carried by one or more short mounting brackets 38 in casing 24. The vane 34 is movable to a position at which it extends transversely across the air inlet duct 22 thereby substantially closing the duct, and is movable against the yielding opposition of a light spring 40 to an open position. An intermediate position is shown in FIGURE 2. The light spring 40 is attached at one end to vane 34 and attached at the other end to a fixed bracket 42 that is carried by a part of the air inlet duct 22 in casing 24.

An air impeller or blower 44 is mounted in the air inlet duct 22 and consists of an electric motor 46 together with a propeller 48 driven by the electric motor 46. A mounting bracket 50 supports motor 46 in air inlet duct 22.

An electrical circuit 52 is operatively connected with motor 46 for the control thereof. The electric motor is a multispeed motor, and made so by the variable resistor 54 connected in circuit therewith. This variable resistor has an electrical conductor 58 attached to one end thereof and connected with control switch 60. Conductor 62 extends from switch 60 and is connected to the electrical power source 64 by way of conductor 66 that is attached to conductor 62 and which has a bypass control switch 72 therein. Electrical conductor 74 extends from the opposite side of source 64 to the movable contactor 76 of variable resistor 54. This movable contactor is attached to the vane 34 for mechanical movement therewith and is insulated therefrom. Consequently, as the vane 34 is moved, movable contactor 76 wipes across the coil of the variable resistor 54 to cut in selected links of the variable resistor coil and thereby vary the effective resistance that is in circuit.

Electric motor 46 has a pair of conductors 80 and 82 extending therefrom. Conductor 80 is attached to conductor 62 and conductor 82 is attached to power source 64.

Accordingly, when switch 72 is closed an electric circuit is established between source 64 and the electric motor 46. When switch 60 is closed and switch 72 opened, an electric circuit is established between source 64, electric motor 46 by way of variable resistor 54 so that the speed of the motor 46 is governed as a function of the position of vane 34 and consequently as a function of dynamic pressure on the vane 34. Of course, the dynamic pressure will be a function of the forward speed of the motor vehicle and the speed of the propeller 48.

A thermostatically controlled damper or baffle 88 is mounted for pivotal movement on spindle 90 across duct 28. A thermostatic spring-type element 92 is connected at one end to the spindle 90 and anchored at the other end to provide a subsequent control of the cubic feet of air discharged through duct 28 in accordance with the temperature of the heated air passing through the heat exchanger 30 whereby the discharge of cool air during warm up of the heat exchanger 30 may be automatically throttled.

Reference is now made principally to FIGURE 4. The only substantial difference between the controller 14 and controller 14a which is disclosed in FIGURE 4 and explained in FIGURE 5 in one detail, is in the type of spring 40a and the location of the variable resistor 54a. Spring 40a is a thermally responsive spring which contracts when cooled expands when heated in order to increase and decrease the pull on the flexible cable to which one end of the spring is secured. The other end of spring 40a is secured to the casing as at 100. The cable is entrained over guides, for example pulleys 104 and 106, and is secured to an arm 108 attached to vane 34a. In view of this, the vane 34a has its position altered not only in accordance with dynamic pressure thereon (which controls the speed of the air impeller) but also in accordance with the heat level of air which passes through the heat exchanger 30a.

The embodiment of FIGURE 6 entails a controller 14b which differs from controllers 14 and 14a principally by the position of spring 40b. It is attached at one end to a mounting bracket 112 and attached at its other end to an arm 114 which is secured to vane 34b. Otherwise, the operation and function of all of the controllers is similar.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A controller for the entry of air into a passenger compartment of a motor vehicle, said controller comprising an air inlet duct, a casing associated with said duct, a vane, means mounting said vane for pivotal movement in said casing so that a surface thereof is exposed to the ram pressure generated by forward movement of the motor vehicle, an air impeller on the upstream side of said vane, an electric motor constituting a part of said air impeller, an electric circuit which includes said electric motor, a variable resistor, means operatively connecting said vane and variable resistor to adjust said variable resistor in response to movement of said vane, whereby the speed of the air impeller is governed in accordance with the position of said vane, resilient means opposing the movement of said vane, and said resilient means including a spring, means connecting said spring with said vane, said last mentioned means including a mechanical connection, said mechanical connection having an elongate flexible member, said spring being a thermally responsive spring adapted to elongate and retract in response to temperature differentials, a water heated heat exchanger on the upstream side of said thermal responsive spring and on the downstream side of said vane.

References Cited in the file of this patent
UNITED STATES PATENTS 2,291,543   Findley _____ July 28, 1942

FOREIGN PATENTS 704,319   Great Britain _____ Feb. 17, 1954
783,757   Great Britain _____ Sept. 25, 1957